US008850281B2

(12) United States Patent
 Potkonjak (10) Patent No.: US 8,850,281 B2
(45) Date of Patent: Sep. 30, 2014

(54) DIGITAL SIGNATURES

(75) Inventor: Miodrag Potkonjak, Los Angeles, CA (US)

(73) Assignee: Empire Technology Development LLC, Wilmington, DE (US)

(*) Notice: Subject to any disclaimer, the term of this patent is extended or adjusted under 35 U.S.C. 154(b) by 791 days.

(21) Appl. No.: 12/464,384

(22) Filed: May 12, 2009

(65) Prior Publication Data
US 2010/0293384 A1 Nov. 18, 2010

(51) Int. Cl.
| G01R 31/28 | (2006.01) |
| G11C 29/00 | (2006.01) |
| G06F 7/04 | (2006.01) |
| G06F 11/00 | (2006.01) |
| H04L 9/32 | (2006.01) |

(52) U.S. Cl.
CPC .......... *H04L 9/3247* (2013.01); *H04L 2209/56* (2013.01); *H04L 2209/805* (2013.01); *H04L 2209/12* (2013.01); *H04L 9/3278* (2013.01)
USPC .................. 714/733; 714/718; 714/52; 726/2

(58) Field of Classification Search
USPC .......................................... 713/200; 714/733
See application file for complete search history.

(56) References Cited

U.S. PATENT DOCUMENTS

| 3,668,319 A | * | 6/1972 | Gerke et al. .................... 340/4.3 |
| 4,112,495 A | * | 9/1978 | Easley ............................ 708/100 |
| 4,523,827 A | * | 6/1985 | Masunaga et al. .............. 396/96 |
| 4,525,849 A | * | 6/1985 | Wolf ............................. 375/372 |
| 5,131,038 A |   | 7/1992 | Puhl et al. |
| 5,133,231 A | * | 7/1992 | Goto et al. .................... 477/150 |
| 5,140,871 A | * | 8/1992 | Goto et al. .................... 477/131 |
| 5,168,777 A | * | 12/1992 | Isono et al. .................... 477/152 |
| 5,182,970 A | * | 2/1993 | Goto et al. .................... 477/151 |
| 5,293,789 A | * | 3/1994 | Goto et al. .................... 477/151 |
| 5,559,961 A |   | 9/1996 | Blonder |
| 5,757,912 A |   | 5/1998 | Blow |

(Continued)

FOREIGN PATENT DOCUMENTS

| JP | 10-003256 A | 6/1998 |
| JP | 2005-523481 A | 8/2005 |

(Continued)

OTHER PUBLICATIONS

Boneh et al., "Short Signatures fom the Weil Pairing," Dec. 9-13, 2001, Proceedings of the 7th International Conference on the Theory and Application of Cryptology and Information Security: Advances in Cryptology, p. 514-532.

(Continued)

*Primary Examiner* — Krista Zele
*Assistant Examiner* — Margishi Desai
(74) *Attorney, Agent, or Firm* — Hope Baldauff, LLC (57) ABSTRACT

Technologies are generally described for secure digital signatures that employ hardware public physically unclonable functions. Each unique digital signature generator can be implemented as hardware such that manufacturing variations provide measurable performance differences resulting in unique, unclonable devices or systems. For example, slight timing variations through a large number of logic gates may be used as a hardware public physically unclonable function of the digital signature unit. The hardware digital signature unit can be parameterized such that its physical characteristics may be publicly distributed to signature verifiers. The verifiers may then simulate randomly selected portions of the signature for verification.

21 Claims, 8 Drawing Sheets

(56) References Cited

U.S. PATENT DOCUMENTS

| | | | |
|---|---|---|---|
| 5,770,846 A | 6/1998 | Mos et al. | |
| 5,796,839 A | 8/1998 | Ishiguro | |
| 5,999,629 A | 12/1999 | Heer et al. | |
| 6,018,717 A | 1/2000 | Lee et al. | |
| 6,076,163 A * | 6/2000 | Hoffstein et al. | 713/168 |
| 6,098,144 A | 8/2000 | De Oliveira | |
| 6,140,935 A | 10/2000 | Hayton et al. | |
| 6,289,324 B1 | 9/2001 | Kawan | |
| 6,446,206 B1 | 9/2002 | Feldbaum | |
| 6,687,714 B1 | 2/2004 | Kogen et al. | |
| 7,098,144 B2 | 8/2006 | Zhang et al. | |
| 7,156,301 B1 | 1/2007 | Bonalle et al. | |
| 7,172,112 B2 | 2/2007 | Bonalle et al. | |
| 7,185,175 B2 * | 2/2007 | Kravec et al. | 712/11 |
| 7,191,333 B1 * | 3/2007 | Maddury et al. | 713/174 |
| 7,206,847 B1 | 4/2007 | Alberth et al. | |
| 7,228,155 B2 | 6/2007 | Saunders | |
| 7,255,745 B2 | 8/2007 | Zhang et al. | |
| 7,306,158 B2 | 12/2007 | Berardi et al. | |
| 7,376,839 B2 | 5/2008 | Carta et al. | |
| 7,418,717 B1 | 8/2008 | Dolske et al. | |
| 7,574,611 B2 | 8/2009 | Cohen | |
| 7,609,092 B2 * | 10/2009 | Wicki et al. | 327/2 |
| 7,681,103 B2 * | 3/2010 | Devadas et al. | 714/752 |
| 7,757,083 B2 * | 7/2010 | Devadas et al. | 713/168 |
| 7,761,714 B2 * | 7/2010 | Luzzi et al. | 713/182 |
| 7,825,774 B2 * | 11/2010 | O'Toole et al. | 340/10.4 |
| 7,840,803 B2 * | 11/2010 | Clarke et al. | 713/168 |
| 7,904,731 B2 * | 3/2011 | Devadas et al. | 713/189 |
| 8,020,125 B1 | 9/2011 | Kuehlmann et al. | |
| 8,510,608 B2 | 8/2013 | Futa et al. | |
| 2003/0177374 A1 | 9/2003 | Yung et al. | |
| 2003/0204743 A1 * | 10/2003 | Devadas et al. | 713/200 |
| 2003/0212829 A1 * | 11/2003 | Schofield et al. | 709/250 |
| 2004/0054907 A1 | 3/2004 | Chateau et al. | |
| 2004/0056416 A1 | 3/2004 | Bennett, III | |
| 2004/0078421 A1 | 4/2004 | Thomas | |
| 2004/0184615 A1 | 9/2004 | Elliott et al. | |
| 2005/0015411 A1 | 1/2005 | Altman | |
| 2005/0093868 A1 | 5/2005 | Hinckley | |
| 2005/0105366 A1 | 5/2005 | Pedlow | |
| 2005/0154858 A1 * | 7/2005 | Kravec et al. | 712/11 |
| 2005/0225079 A1 | 10/2005 | Woontner | |
| 2005/0268096 A1 | 12/2005 | Kilian et al. | |
| 2006/0010079 A1 | 1/2006 | Brickell | |
| 2006/0119913 A1 | 6/2006 | Zhang et al. | |
| 2006/0248340 A1 | 11/2006 | Lee et al. | |
| 2006/0271793 A1 * | 11/2006 | Devadas et al. | 713/189 |
| 2007/0174629 A1 * | 7/2007 | Suominen | 713/182 |
| 2007/0183194 A1 * | 8/2007 | Devadas et al. | 365/185.03 |
| 2009/0083833 A1 * | 3/2009 | Ziola et al. | 726/2 |
| 2009/0169018 A1 | 7/2009 | Deisher | |
| 2009/0183248 A1 | 7/2009 | Tuyls et al. | |
| 2009/0222672 A1 * | 9/2009 | Clarke et al. | 713/189 |
| 2010/0085075 A1 * | 4/2010 | Luzzi et al. | 326/8 |
| 2010/0127822 A1 * | 5/2010 | Devadas | 340/5.8 |
| 2010/0293612 A1 | 11/2010 | Potkonjak et al. | |
| 2010/0322418 A1 | 12/2010 | Potkonjak et al. | |

FOREIGN PATENT DOCUMENTS

| | | | |
|---|---|---|---|
| JP | 2008-516472 A | 5/2008 | |
| WO | 2008/056612 A1 | 5/2008 | |
| WO | 2009/002599 A2 | 12/2008 | |
| WO | 2011016900 | 2/2011 | |

OTHER PUBLICATIONS

Chaum et al. "Undeniable signatures," Jul. 1989, Proceedings on Advances in cryptology, Santa Barbara, California, p. 212-216.

Horster et al, "Meta-ElGamal signature schemes," Nov. 1994, Proc. of the 2nd ACM Conference on Computer and communications security, p. 96-107. Abstract.

Ngai et al., "A review for mobile commerce research and applications," Feb. 2007, Decision Support Systems, 43 (1,): 3-15.

Tuyls et al. "Read-proof hardware from protective coatings", Oct. 10-13, 2006, Cryptographic Hardware and Embedded Systems—CHES 2006, ser. Lecture Notes in Computer Science, vol. 4249. pp. 369-383.

Diffe et al., "New Directions in Cryptography", IEEE Transactions on Information Theory, IT-22(6):644-654, Nov. 1976.

ElGamal, "A Public.Key Cryptosystem and a Signature Scheme Based on Discrete Logarithms," Jul. 1985, IEEE Trans. on Information Theory, IT-31(4): 469-472.

Fiat, et al., "How to prove yourself: practical solutions to identification and signature problems," Jan. 1987, Proceedings on Advances in cryptology—CRYPTO '86, p. 186-194.

Goldwasser et al, "A digital signature scheme secure against adaptive chosen-message attacks," SIAM Journal on Computing, 17(2):281-308, Apr. 1988.

Hernandez-Velez, M. "Nanowires and 1D arrays fabrication: An Overview"; Thin Solid Films 495(1-2): 51-63, Jan. 2006. Abstract.

Holcomb et al., "Initial SRAM State as a Fingerprint and Source of True Random Numbers for RFID Tags", Jul. 2007, Proceedings of the Conference on RFID Security, 12 pages.

Lee et al., "A technique to build a secret key in integrated circuits for identification and authentication application", Jun. 17-19, 2004, Symposium on VLSI Circuits, Digest of Technical Papers, pp. 176-179.

Lim et al., "Extracting secret keys from integrated circuits", 2005, IEEE Transactions on Very Large Scale Integration (VLSI) Systems, 13(10): 1200-1205.

Lysyamskya, Anna, "Signature Schemes and Applications to Cryptographic Protocol Design", PhD thesis, MIT, Sep. 2002, 134 pages.

Merkle, Ralph "A certified digital signature", 1989, Proceedings on Advances in Cryptology—CRYPTO '89, vol. 435, pp. 218-238.

Messerges et al., "Digital rights management in a 3G mobile phone and beyond" Oct. 2003 Proceedings of the 3rd ACM workshop on Digital rights management, pp. 27-38.

Paterson, K. "ID-based signatures from pairings on elliptic curves," Aug. 29, 2002, Electronics Letters, 38 (18):1025-1026.

Ravikanth, P., "Physical one-way functions", Mar. 2001, Thesis, MIT, 154 pages.

Shamir, Adi "Identity-based cryptosystems and signature schemes," Aug. 1985, Proceedings of CRYPTO 84 on Advances in cryptology, p. 47-53.

Burrows et al., "A Logic of Authentication", Feb. 1990, ACM Transactions on Computer Systems, 8(1):18-36.

Chaum, D., "Blind Signatures for Untraceable Payments", 1983, Advances in Cryptology: Proceedings of Crypto 82, Plenum Press, pp. 199-203.

Chaum, D., "Untraceable Electronic Mail, Return Addresses, and Digital Pseudonyms", Feb. 1981, Communications of The ACM, 24(2): 84-90.

Feige, et al., "Zero Knowledge Proofs of Identity", Jun. 1988, Journal of Cryptology, 1(2):77-94.

Flajolet, et al., "Birthday Paradox, Coupon Collectors, Caching Algorithms and Self-Organizing Search", 1987, INRIA: Unite de Recherche INRIA-Rocquencourt, No. 720, 20 pages.

Gassend, et al., "Controlled Physical Random Functions", Dec. 9-13, 2002, Proceedings of the 18$^{th}$ Annual Computer Security Applications Conference, 12 pages.

Kocher, P., "Timing Attacks on Implementations of Diffie-Hellman, RSA, DSS, and Other Systems", 1996, CRYPTO '96, LNCS 1109, Springer-Verlag, Berlin, 10 pages.

Majzoobi, et al., "Lightweight Secure PUFs", 2008, IEEE/ACM International Conference on Computer Aided Design (ICCAD), 4 pages.

Majzoobi, et al., "Testing Techniques for Hardware Security", 2008, IEEE International Test Conference, 10 pages.

Rivest, et al., "A Method for Obtaining Digital Signatures and Public-Key Cryptosystems", Feb. 1978, Communications of the ACM, 21(2):120-126.

Saxena, et al., "Variation in Transistor Performance and Leakage in Nanometer-Scale Technologies", Jan. 2008, IEEE Transactions on Electron Devices, 55(1): 131-144.

(56) References Cited

OTHER PUBLICATIONS

Suh, et al., "Physical Unclonable Functions for device Authentication and Secret Key Generation", Jun. 4-8, 2007, DAC 2007, San Diego, California, 6 pages.
Wagner, D., "A Generalized Birthday Problem", Aug. 18-22, 2002, Proceedings of the Advances in Cryptology—CRYPTO 2002, International Conference on the Theory and Applications of Cryptographic Techniques, Santa Barbara, California, vol. 2442, pp. 288-304.
Leslie Lamport, "Constructing Digital Signatures From a One-Way Function," Technical Report CSL-98, SRI International, Oct. 18, 1979.
Michael O.Rabin, "Digitalized Signatures As Intractable As Factorization," Technical Report MIT/LCS/TR-212, MIT Laboratory for Computer Science, Jan. 1979.
Mambo, M et al., "Proxy Signatures for Delegating Signing Operation," Proceedings of the 3rd ACM Conference on Computer and Communications Security, Mar. 14-15, 1996, New Delhi, India, pp. 48-57.
T.Elgamal, "A Public Key Cryptosystem and a Signature Scheme Based on Discrete Logarithms," IEEE Transactions on Information Theory, Jul. 1985, vol. IT-31, No. 4, pp. 469-472.
U.S. Office Action dated Oct. 14, 2011 in U.S. Appl. No. 12/464,387.
U.S. Office Action dated Jun. 5, 2012 in U.S. Appl. No. 12/464,387.
U.S. Office Action dated Jun. 12, 2012 in U.S. Appl. No. 12/486,451.
International Search Report & Written Opinion dated Feb. 1, 2011 in PCT Application No. PCT/US10/37918.
Alkabani et al., "Trusted Integrated Circuits: A Nondestructive Hidden Characteristics Extraction Approach." 2008, Information Hiding, Lecture Notes in Computer Science, 5284/2008: 102-117. Abstract.
Beckmann et al., "Hardware-Based Public-Key Cryptography with Public Physically Unclonable Functions," 2009, 11th International Workshop 2009 on Information Hiding, Darmstadt, Germany, Jun. 8-10, 2009, Lecture Notes in Computer Science, vol. 5806/2009, pp. 206-220.
Bellare, M., et al., "Entity Authentication and Key Distribution", Aug. 1993, Advances in Cryptology—Crypto '93 Proceedings, 29 pages.
Halevi, S., et al., "Public-Key Cryptography and Password Protocols", 1998, ACM Transactions on Information and System Security, pp. 230-268, Abstract.
Haller, N., "The S/KeyTM One-Time Password System", 1994, Proceedings of the Internet Society Symposium on Network and Distributed Systems, pp. 151-157.
Lamport, L., "Password Authentication with Insecure Communication", Nov. 1981, Communications of the ACM, 24(11):770-772.
Lampson, B., et al., "Authentication in Distributed Systems: Theory and Practice", Nov. 1992, ACM Transactions on Computer Systems, 104):265-310.
Morris, R., et al., "Password Security: A Case History", 1979, Communications of the ACM, vol. 22, pp. 594-597.
Needham, R., et al., "Using Encryption for Authentication in Large Networks of Computers", Dec. 1978, Communications of the ACM, 21(12):993-999.
Neuman, B., et al., "Kerberos: An Authentication Service for Computer Networks" Sep. 1994, ISI Research Report, ISI/RS-94-399, IEEE Communications Magazine, 32(9):33-38.

Okamoto, T., et al., "A New Public-Key Cryptosystem as Secure as Factoring", 1998, Eurocrypt '98, LNCS 1403, Abstract.
Paillier, P., "Public-Key Cryptosystems Based on Composite Degree Residuosity Classes", 1999, Advances in Cryptology—Eurocrypt '99, vol. 1592 of Lecture Notes in Computer Science, pp. 223-238.
Pappu, R., et al., "Physical one-way functions," Science, vol. 297, No. 5589, Sep. 20, 2002, pp. 2026-2030.
Shamsi et al., "Noninvasive Leakage Power Tomography of Integrated Circuits." 2008, Proceedings of the 13th International Symposium on Low Power Electronics and Design (ISLPED '08), ACM, pp. 341-346.
U.S. Notice of Allowance dated Nov. 2, 2012 in U.S. Appl. No. 12/486,451.
Chang, C. and Wu, T., "Remote Password Authentication with Smart Cards," IEEE Proceedings, vol. 138, Issue 3, May 1991, pp. 165-168.
Bonch, D. and Franklin, M., "Identity-Based Encryption from the Weil Pairing," SIAM Journal of Computing, vol. 32, No. 3, pp. 586-615 (2003).
U.S. Official Action dated Feb. 18, 2014 in U.S. Appl. No. 12/464,387.
Bellare, M. et al., "Relations Among Notions of Security for public-Key Encryption Schemes," Advances in Cryptology—Crypto '98 Proceedings, Lecture Notes in Computer Science, vol. 1462, pp. 32, Springer-Verlag (1999).
Rabin, Michael O., "Digitalized Signatures As Intractable As Factorization," Technical Report MIT/LCS/TR-212, MIT Laboratory for Computer Science, Jan. 1979.
Boyar et al., "Convertible Undeniable Signatures," Aug. 11-15, 1990, Proceedings of the 10th Annual International Cryptology Conference on Advances in Cryptology, p. 189-205.
Horster et al., "Meta-ElGamal signature schemes," Nov. 1994, Proc. of the 2nd ACM Conference on Computer and communications security, p. 96-107. Abstract.
Ngai et al., "A review for mobile commerce research and applications," Feb. 2007, Decision Support Systems, 43(1), 3-15.
Tuyls et al., "Read-proof hardware from protective coatings", Oct. 10-13, 2006, Cryptographic Hardware and Embedded Systems—CHES 2006, ser. Lecture Notes in Computer Science, vol. 4249. pp. 369-383.
Xia et al, "One-Dimensional Nanostructures: Synthesis, Characterization, and Applications," Mar. 4, 2003, Advanced Materials, 15(5): 353-389.
Alkabani et al., "Input Vector Control for Post-Silicon Leakage Current Minimization in the Presence of Manufacturing Variability." 2008, Proc. of the 45th Annual design automation conference (DAC '08), pp. 606-609. Abstract.
Gassend, et al. "Silicon physical random functions", 2002, Proceedings of the 9th ACM conference on Computer and Communications Security, pp. 148-160.
Lampson, B., et al., "Authentication in Distributed Systems: Theory and Practice", Nov. 1992, ACM Transactions on Computer Systems, 10 (4), 265-310.
Office Action dated Nov. 11, 2013 in Chinese Application Serial No. 201090027751.8.
Notice of Allowance dated Nov. 20, 2013 in Korean Application Serial No. 10-2012-7001357.
Office Action dated Feb. 25, 2013 in Japanese Application Serial No. 2012-515096.
Office Action dated Aug. 30, 2013 in Japanese Application Serial No. 2012-515096.

\* cited by examiner

DIGITAL SIGNATURES

BACKGROUND

A digital signature generally provides a mechanism for a receiver of a digital message to have confidence that the message was in fact sent by a purported sender. A digital signature can function analogously to a traditional handwritten signature. Digital signatures can provide non-repudiation and time stamping to prevent the sender from denying that they sent the message, and possibly also to prevent the sender from disputing the time that the message was sent. Digital signatures are generally based on cryptographic mechanisms. For example, digital cryptographic keys may be used to sign a digital message with a digital signature. The digital message can include any digital information.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is drawn to methods, apparatus, systems and computer program products related to digital signatures using hardware public physically unclonable functions. Traditional cryptographic mechanisms may be used for digital signatures. For example, traditional digital signature techniques may employ verification procedures based on public key cryptography using mathematical one way functions or one way trapdoor functions. While traditional cryptographic techniques generally employ mathematical and computational approaches, physical laws and technology constraints may also be employed. For example, inherent manufacturing variability in semiconductor integrated circuits (ICs), particularly at very deep submicron technology scales, may be leveraged to produce unique, unclonable systems. The unclonable nature of such a device or system can provide the basis of a secure digital signature.

Inherent manufacturing variability in modern and future complimentary metal-oxide semiconductor (CMOS) technologies, or other such semiconductor technologies, can introduce gate-level uniqueness within each instance of manufacture. Various technological challenges arise when attempting to fabricate ICs with exact feature sizes for gates and interconnecting conductors. Similar challenges may affect doping levels. These challenges may include wafer lattice structure imperfections, non-uniform dopant distribution, mask misalignment, and chemical or mechanical polishing. As such, each manufactured IC of a single design may generally have gates that differ slightly in terms of their timing, area, power, and soft-error rate susceptibility. Operating such ICs in a manner as to manifest these subtle differences can provide ICs with unique operational characteristics. Similarly, photonic crystal based optical inter-chip and intra-chip interconnects may be leveraged as for their unique operational characteristics due to manufacturing variability. Such photonic interconnects can support high throughput and low delay distribution for signals and clocks.

A digital signature unit can be implemented as a large number of logic gates with an input register supplying inputs into the gates and one or more output registers to latch the results from the gates at specified delay periods after the input. A host computer interfaced to the unique digital signature unit can specify an input vector and one or more clocking delays as inputs to the digital signature unit.

The digital signature generation can begin by issuing the input vector to an input register of the digital signature unit. As the signals associated with the input vectors propagate through the logic gates, results can be latched into output registers. The output registers can be positioned at various points along the propagation path through the logic gates. The results latched into the output registers may then be returned to the host computer. The digital signature unit can generate results in real-time, for example in one or a few clock cycles. Since the results depend on timing characteristics of each gate, an imposter attacker would have to simulate or emulate the digital signature unit at the gate-level with exact timing accuracy to generate the signature of the signer.

If the number of gates in the digital signature unit is given by N, simulation of the unit has a complexity of $O(N^3)$ for each input vector cycle and multiple cycles may be employed. Thus, for 100,000 gates, an imposter would require more than $10^{15}$ operations to be completed for simulating the entire output results of the digital signature unit. In contrast, the digital signature unit can provide the results in one or a few clock cycles. As such, digital signature generation as fast as one nanosecond and having an energy consumption of a few nanojoules may be possible.

A recipient of a digital signature, as generated by the digital signature unit, can probabilistically check the correctness of the received digital signature. The recipient can randomly select a subset of relatively few outputs to calculate when verifying the signature. Also, the recipient can randomly select specific stages of the outputs to be used in verifying the signature. The verification by the recipient can also be calculated without time constraint. The recipient can check these selected portions quickly. For example, within milliseconds or seconds. However, complete simulation of the signature output can require a prohibitively long number of computations, for example have $10^{30}$ operations or more. Thus, protocols that require an imposter signature generator to conduct complete simulations can provide digital signature schemes with a high level of security. It is the complexity gap between results provided by the hardware digital signature unit and complete simulation along with the complexity gap between partial verification and complete simulation that can support powerful and flexible secure digital signatures.

Figure 1:
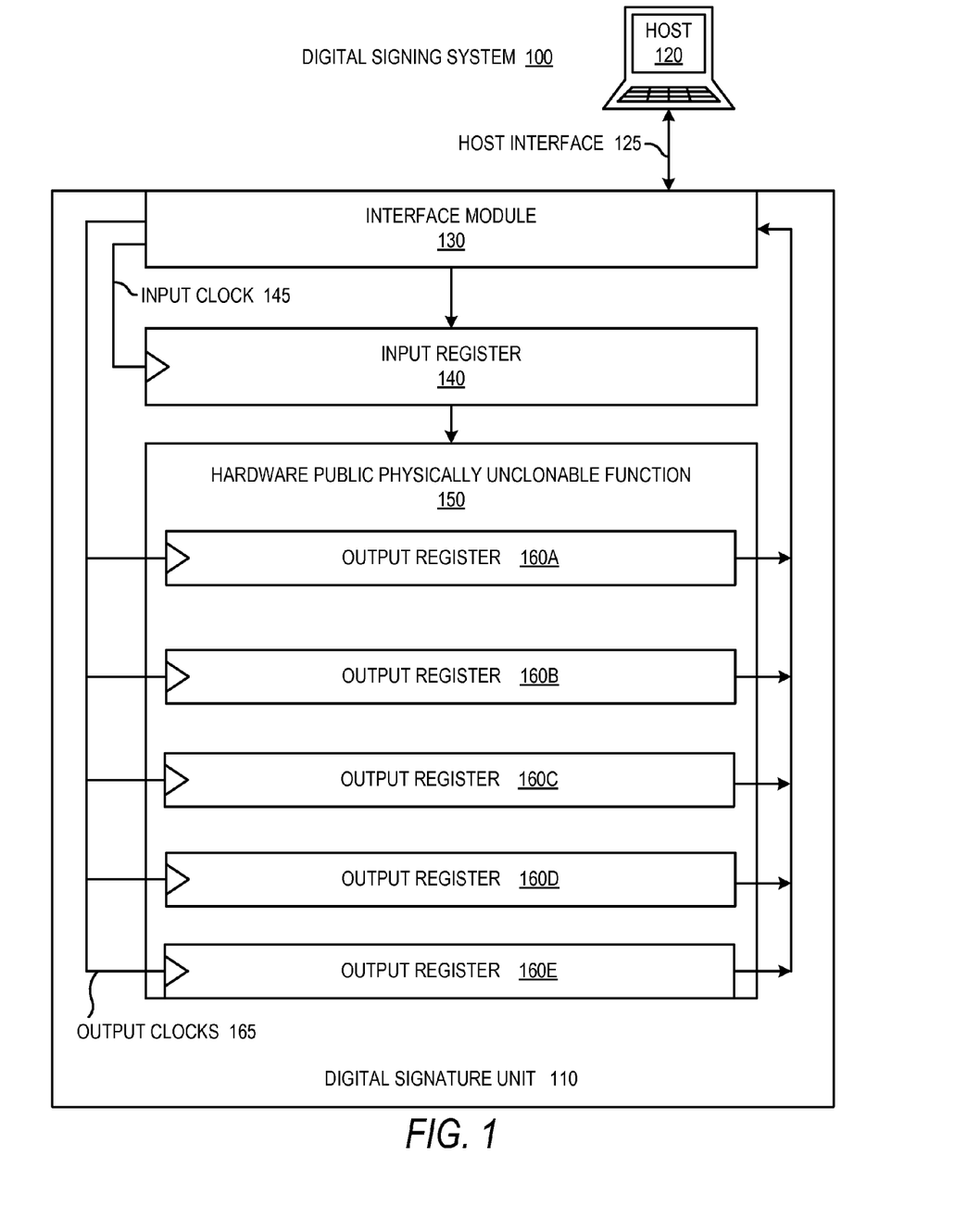
FIG. 1 is a block diagram illustrating a digital signing system with a host computer and a hardware digital signature unit.

Turning now to FIG. 1, a digital signing system 100 with a host computer 120 and a hardware digital signature unit 110 is illustrated, according to one or more embodiments presented herein. The host computer 120 may access the hardware digital signature unit 110 using the host interface 125 in order to generate digital signatures.

The hardware digital signature unit 110 can be manufactured such that each individual instance of the manufacturing process produces a hardware digital signature unit 110 that is unique from other hardware digital signature units. As such, the physical possession of the hardware digital signature unit 110 can be used to generate a signature that is unique to that particular signer associated with the host computer 120.

The host interface 125 may be any computer interface. For example, the host interface 125 may be serial, parallel, universal serial bus (USB), peripheral component interconnect (PCI), wired, wireless, Bluetooth, radio frequency identification (RFID), fiber optical, free space optical, or any other interface reasonable for coupling the hardware digital signature unit 110 to the host computer 120. An interface module 130 within the hardware digital signature unit 110 can provide an interface between the hardware digital signature unit 110 and the host interface 125 for communicating information to and from the host computer 120.

The host computer 120 may request a digital signature generation from the hardware digital signature unit 110. The digital signature request may include an input vector based on the document to be signed. The input vector may be all, or a portion of, the document to be signed as a direct input. The input vector may also be mathematically based upon the document to be signed by an operation such as a hash function. The signature generation request may be offered to the hardware digital signature unit 110 by communicating the request to the interface module 130 of the digital signature unit 110. The input vector of the digital signature request may provide the initial values to be clocked into the input register 140 from the interface module 130. An input clock 145 may be used to clock the inputs into the input register 140. The input vector, once clocked into the input register 140, can feed into the hardware public physically uncloneable function (HPPUF) 150.

The HPPUF 150 can be manufactured as a plurality of logic gates, semiconductor signal paths, an array of plasmonic paths, a photonic crystal structure, nanowire gates, any other nanowire structure, or any structure that may be varied slightly in each manufacturing instance in a fashion that affects the operation of the structure as measured. The variation in the structure between manufacturing instances may be due to manufacturing process variances, intentional manufacturing perturbations, or both. In a combinational logic HPPUF 150 embodiment, manufacturing variability can manifest as each logic gate having different delay, power, or other physical characteristics even between integrated circuits that correspond to the same design. The HPPUF 150 is a physical system that may be completely characterized so that it can be accurately simulated. However, the HPPUF 150 simulation can require a much longer time than the execution of the actual HPPUF 150 hardware.

Resulting output values from various stages within the HPPUF 150 can arrive at the output registers 160A-160E. Output clocks 165 can latch the output values of the HPPUF 150 into the output registers 160A-160E at specified times. The output clocks 165 can be generated at specific time delays or phase offsets from the input clock 145. A timing mechanism such as a timer, delay, phase locked loop, or otherwise may support the generation of transitions in the output clocks 165 at the specified times after the transition in the input clock 145 that began the signal propagation through the HPPUF 150. The output values latched into the output registers 160A-160E can be delivered to the interface module 130 for access over the host interface 125 to the host computer 120. A digital signature generation request can include specifying values to the hardware digital signature unit 110 to be loaded into the input registers 140 along with specified times for latching the output values into the output registers 160A-160E using the output clocks 165.

The time required for complete simulation of all possible outputs of the HPPUF 150 can require a very long time using today's most advanced technology (on the order of years, decades, or even centuries). In contrast, the calculation of outputs using the HPPUF 150 hardware itself may require less than a nanosecond. Also, probabilistic verification of a small randomly selected subset of outputs, or changes between randomly selected stages of outputs, can be done on the order of milliseconds. Thus, it may be considered impossible to emulate the HPPUF 150 rapidly enough to generate a complete digital signature, but the same digital signature may be computationally reasonable to statistically verify.

The digital signature unit 110 may be considered intrinsically resilient against side channel attacks, physical attacks, and software vulnerabilities. The hardware digital signature unit 110 may be inexpensive to manufacture and may be ultra fast and ultra low power. The hardware digital signature unit 110 can be used in numerous applications such as email signing, software download, software update, firmware update, stored data access and verification, financial transitions, digital payment systems, voice and data communications, video communications, credit card transactions, identification card transactions, subscriber identity module (SIM) operations, or various other signing or secure communications applications.

One hardware digital signature unit 110 can employ one or more HPPUFs 150. A digital signature can also involve signing multiple blocks, portions, or hashes of a source document or message. Multiple outputs or portions of outputs from one or more HPPUFs 150 may be used to support signatures of diverse simulation computational difficulty. For example, the HPPUFs may have different sizes and simulation requirements. The output from the HPPUF 150 may be applied to a hash function.

Time, radiation, electro-migration, and other effects may cause an HPPUF 150 to drift from its initial characterization. If this occurs, the hardware digital signature unit 110 may generate results that no longer correspond to simulations based on the public characterization of the digital signature unit 110. Instead of being discarded, such a digital signature unit 110 may be re-characterized and returned to use with an updated set of public descriptor information corresponding to its new physical properties.

Input data associated with a digital signature request can be supplied to the hardware digital signature unit 110 using a high bandwidth interconnect such as plasmonic, photonic crystal, radio frequency, or three-dimensional structures. The input vectors for digital signature generation may be expanded by seeding or initializing ciphers, shift registers, linear feedback shift registers, random number generators to produce an increased number of input bits, or in any other manner. Fault tolerance associated with a digital signature may be improved by combining multiple digital signatures using Lagrange polynomials or error correction codes.

Measured leakage power may be used as a component for the digital signature. Measured switching power may also be used as a component for the digital signature. Digital signatures may be created by specifying setup parameters for the hardware digital signature unit 110 that impact the generated signature, such as supply or bias voltages.

The characteristics of the HPPUF 150 that generate the digital signatures may be registered within a Public Key Infrastructure (PKI) authority, or digital certificate authority (CA) in order to establish the connection between the digital signature hardware and a personal, physical, or legal entity. A hardware-based time stamping protocol or a time stamping protocol may be used with the digital signature to establish proof that a particular signature was generated for a document and a specified time. A global positioning system (GPS) signal may be used with a digital signature to support proving that a document was signed at a particular time and/or location. Hardware-based digital signatures may be used in conjunction with mathematical and algorithmic public key techniques to support combined digital signing methods.

The signals within the hardware digital signature unit 110 may be established by gate delays, difference in gate delays, switching power, leakage power, and other physical or operations characteristics that can be measured from the hardware digital signature unit 110. The HPPUF 150 may employ multiplexers for eliminating logic or signal races between reconvergent paths within the HPPUF 150.

A nanowire structure may be the basis of the HPPUF 150. Nanowire structures may include very tiny wire structures having cross-sections on the order of about 100 nanometers or less. Nanowire structures may be self assembling. A photonic crystal structure may also be the basis of the HPPUF 150. Such a photonic crystal may be considered a photonic nanostructure capable of interacting optically with electromagnetic waves.

Figure 2:
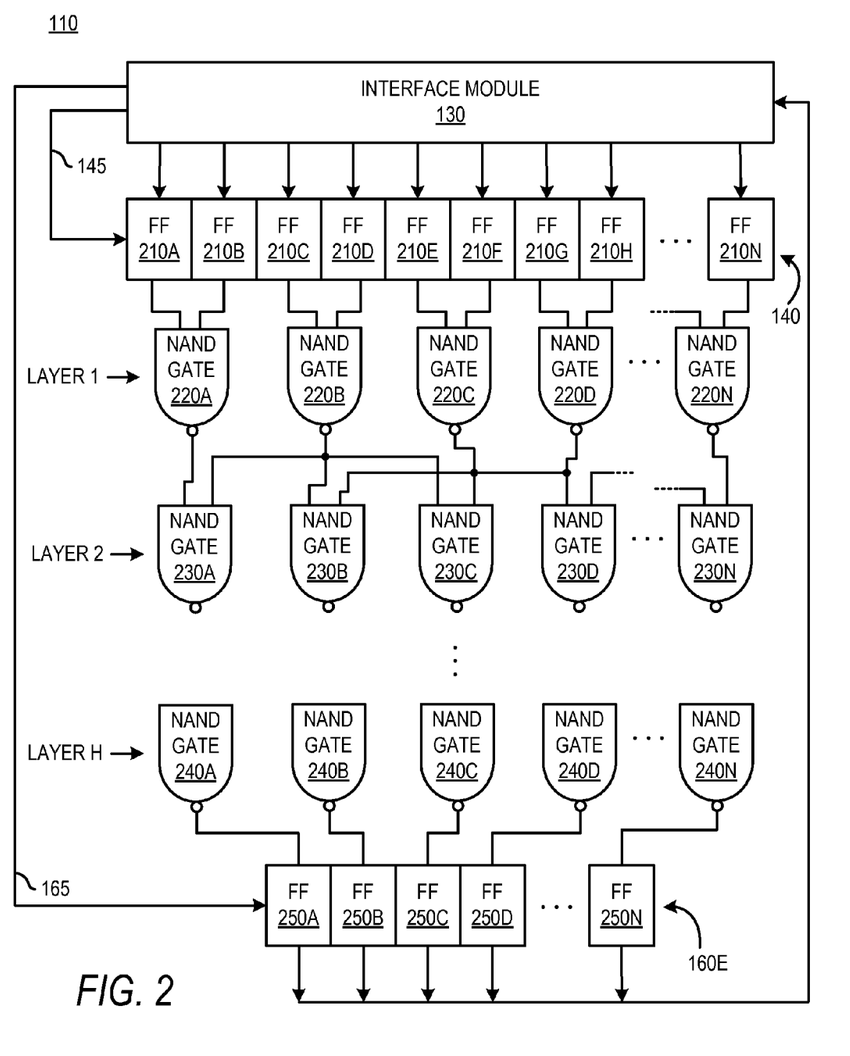
FIG. 2 is a block diagram illustrating a digital signing unit using a logic gate-based hardware public physically unclonable function.

Turning now to FIG. 2, a hardware digital signature unit 110 using a logic gate hardware public physically unclonable function is illustrated according to some embodiments presented herein. The input register 140 can be implemented as a collection of flip-flops 210A-210N. The flip-flops can be clocked by input clock 145 from the interface module 130. The outputs of the flip flops 210A-210N making up the input register 140 may serve as inputs to a first layer of NOT-AND (NAND) gates 220A-220N. The outputs from the first layer of NAND gates 220A-220N may serve as inputs to a second layer of NAND gates 230A-230N. The outputs from the second layer of NAND gates 230A-230N may serve as inputs to further layers of NAND gates, and so on, continuing until layer H of NAND gates 240A-240N.

The outputs from layer H of NAND gates 240A-240N may serve as inputs into the output register 160E. The output register 160E may be made up of an array of flip-flops 250A-250N. The output flip-flops 250A-250N can be clocked by an output clock 165. Multiple other output registers 160A-160D may be positioned at various layers of NAND gates within the hardware digital signature unit 110. The output values of the output of the output registers 160A-160E may feed back to the interface module 130 for response to the host computer 120. The total number of logic gates making up the HPPUF 150 may be tens, hundreds, thousands, millions, or more according to embodiments and operational context.

The HPPUF 150 may be formed from NAND gates as illustrated, however other types of logic gates may also be used. It should be appreciated that multiple input logic gates, such as two-input, three-input, four-input, or otherwise may be used as the logic gates making up the HPPUF 150. Mixed types of logic gates and gates with varying numbers of inputs may be used within a single HPPUF 150. For example, OR gates, NOT-OR (NOR) gates, AND gates, NAND gates, exclusive-OR (XOR) gates, or other types of combinational logic may be used within the HPPUF 150. The interconnection between layers of logic gates, for example between the first layer of NAND gates 220A-220N and the second layer of NAND gates 230A-230N may be any variety of interconnections from one layer to the next, such that the outputs of each layer are reasonably dependent on a variety of inputs from the previous layer. The number of output flip-flops 250A-250N may generally be the same as the number of input flip-flops 210A-210N, although these two numbers may also vary.

The width of the HPPUF 150, or W, may be related to either one of, or both of, the number of input flip-flops 210A-210N and the number of output flip-flops 250A-250N. The number of layers within the HPPUF 150, or H, may be considered the height of the HPPUF 150. It may be advantageous for the product $(W \times 2^H)$ to be large. Assuming that $W=10^6$ and $H=80$, approximately $10^{30}$ calculations may be needed to reproduce the output of the HPPUF 150. This may be compared to over one billion years on one billion computers. Reducing H to 60 may reduce the compared computation to about one million years on one million computers. Reducing H to about 50 can provide a computational complexity for the HPPUF 150 that will generally support a secure digital signature. Assuming that $W=10^9$, then $H=40$ will also generally support a secure digital signature.

When application of the HPPUF 150 is iterated M times, W may be reduced linearly with M while H may be reduced logarithmically with M. Thus, for $M=10^9$, vales of $W=10^6$ and $H=20$ can generally provide a secure digital signature. In general, W may be reduced to 1000 or even a few hundred, but it may be desirable to not reduce W below 100 in an attempt to avoid susceptibility to guess-based attacks. Setting W as large as possible may serve to reduce the required timing accuracy for sampling the output of the HPPUF 150.

Manufacturing variability within the semiconductor process for forming the hardware digital signature unit 110 (and specifically, the logic gates of the HPPUF 150) can allow for uniqueness of each individually manufactured hardware digital signature unit 110. For example, structure sizes and electrical characteristics of semiconductor structures or transistors within each gate may slightly alter the speed, delay, or timing related to each gate relative to other gates.

For example, in one manufactured instance of the hardware digital signature unit 110, NAND gate 220A may have more delay than NAND gate 220B. In another manufactured instance, NAND gate 220B may have more delay than NAND gate 220A. These variances may be related to manufacturing variability such as lithographic alignment, doping, metallization, or other semiconductor manufacturing characteristics. Variation in the delay of a signal through the logic gates within the HPPUF 150 can cause the output at each layer to contain multiple transitions as one gate generates its output later than another respective logic gate. For example, if NAND gate 220A has more delay than NAND gate 220B, the output from layer one into layer two will see a transition as NAND gate 220B delivers its output and then an additional transition at a slighter later time as NAND gate 220A generates its output.

At each of the H layers within the HPPUF 150, the number of transitions in the signals can be multiplied to the point where at the final layer, or layer H, the outputs vary for several sets of values over a time period beginning at the fastest signal to arrive at the output until quiescence at the final logic output. This period of output variability provides a window during which the output clocks 165 may specifically sample a set of outputs for any level supported by an output register 160A-160E. Because the timing variability between the various logic gates may be unique to each manufactured instance of the hardware digital signature unit 110, the specific logic states sampled at the output registers 160A-160E at the specific delays may also be unique to the hardware digital signature unit 110. Sampling this time instance as the result of the HPPUF 150 can provide the unique operation and output for digital signature generation using the hardware digital signature unit 110. Because exact sampling may be difficult, a signature may be verified as correct if it matches the output state of the HPPUF 150 over a small time window of variation around the specified sampling time.

When a specific instance of the hardware digital signature unit 110 is manufactured, the timing characteristics identified above may be characterized and distributed as public information regarding that instance of the hardware digital signature unit 110. The public information regarding the particular hardware digital signature unit 110 may be used by a signature verifier to validate that the signature was generated by that instance of the HPPUF 150 within that particular hardware digital signature unit 110. While this simulation might take up to several seconds to compute, the hardware digital signature unit 110 can compute the complete digital signature very rapidly, perhaps within several nanoseconds. The large number of digital signature output values from the output registers 160A-160E can preclude an impersonator from providing a complete digital signature. Thus, a rapid verification of randomly selected portions of the digital signature may support verification that the signature was generated by the one particular hardware instance of the hardware digital signature unit 110.

Figure 3:
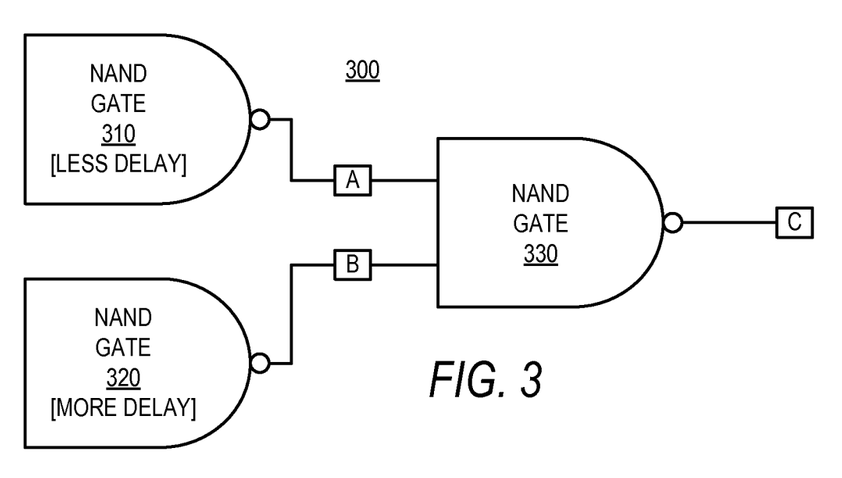
FIG. 3 is a circuit diagram illustrating three logic gates arranged to demonstrate the effects of varying gate delays.

Turning now to FIG. 3, a circuit diagram 300 illustrates three logic gates arranged to demonstrate the effects of varying gate delays according to one or more embodiments presented herein. NAND gate 310 and NAND gate 320 may provide their outputs as inputs to NAND gate 330. NAND gate 310 may have a slightly lower delay than the delay of NAND gate 320. Thus, the output (signal A) of NAND gate 310 may arrive at the input of NAND gate 330 prior to the output of NAND gate 320 (signal B). The output of the NAND gate 330 (signal C) can depend upon both signal A and signal B since NAND gate 330 takes signals A and B as its input.

Figure 4:
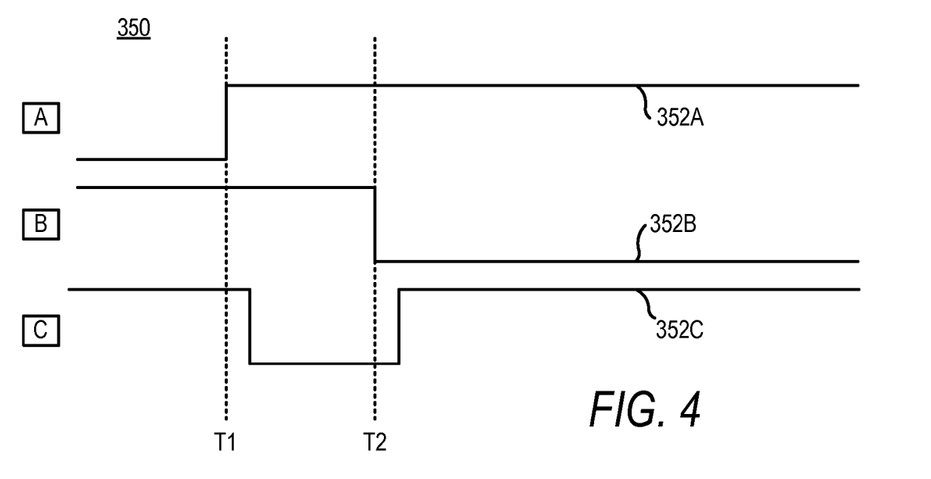
FIG. 4 is a timing diagram illustrating the effects of increasing the number of signal transitions due to varying gate delays between two layers of a hardware public physically unclonable function.

Turning now to FIG. 4, a timing diagram 350 illustrates the effects of increasing the number of signal transitions due to varying gate delays between two layers of a hardware public physically unclonable function according to one or more embodiments presented herein. The signals within the timing diagram 350 are those defined with respect with FIG. 3. The NAND gate 310 output is signal A and is illustrated as timing trace 352A. The NAND gate 320 output is signal B and is illustrated as timing trace 352B. The NAND gate 330 output is signal C and is illustrated as timing trace 352C. The transition of the NAND gate 310 output (signal A) is at time T1 and is followed later at time T2 with the transition of the output from NAND gate 320 (signal B). The trace 352C for signal C illustrates the output of NAND gate 330 taking signal A and signal B as its input. The trace 352C for signal C illustrates how the output of NAND gate 330 may transition at each transition of its input. Thus, the delay between the two inputs from NAND gate 310 and NAND gate 320 may cause the output of NAND gate 330 to actually transition twice even though there is only one transition at each of the inputs. With a potentially doubling of signal transitions at each layer in a stack of two-input gates, layer H may have as many as $2^H$ signal transitions over a short period of time. The output of the digital signature unit 110 may be obtained by sampling this sequence of transitioning values at a specified time. The slight delay in transitions within the trace 352C for signal C may be related to the delay through NAND gate 330.

Sampling the sequence of transitioning output values may require a very accurate timing mechanism. The accuracy requirement may increase exponentially with H. As discussed above, increasing M (an iteration count for applying the HPPUF 150) and increasing W (a width associated with the HPPUF 150) can reduce the value for H without necessarily decreasing the computational complexity of the HPPUF 150. A value of H=20 may be currently reasonable for manufactured logic gates. A value of H=30 may be considered a limit of on-chip clocking according to certain semiconductor embodiments. A value of H=70, or more, may be possible with advanced clocking techniques such as technology used in atomic clocks.

Figure 5:
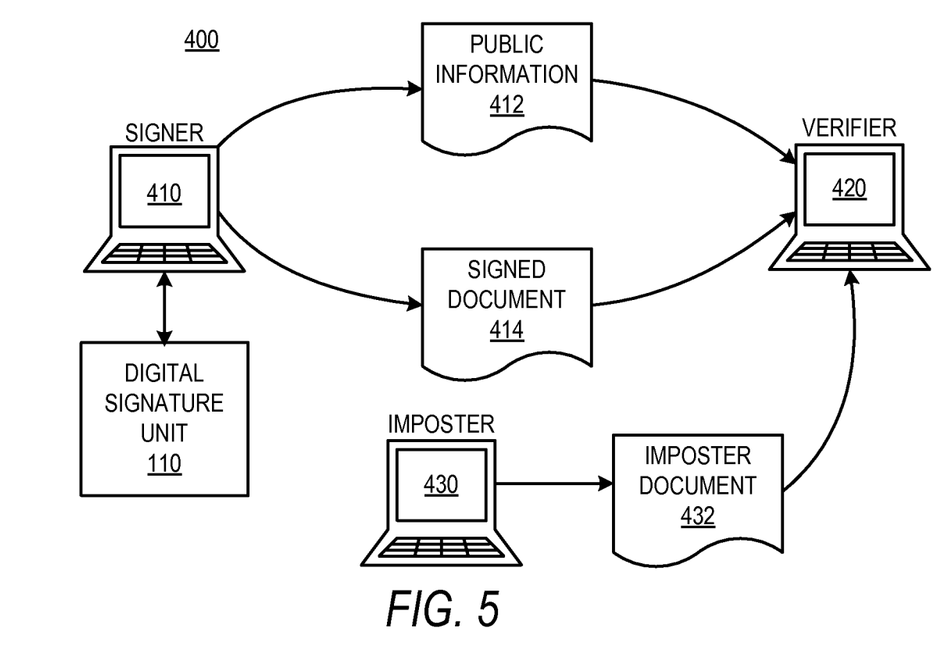
FIG. 5 is a computer network diagram illustrating an operating environment for digital signatures.

Turning now to FIG. 5, computer network diagram illustrates an operating environment for digital signatures. A signer 410 can be a computer system that is coupled to or can access a digital signature unit 110. For example, the host computer 120 as discussed with respect to FIG. 1 may be a signer 410. The unique characteristics of the digital signature unit 110 can be transmitted as public information 412 from the signer 410 to the verifier 420. The public information 412 may also be part of a digital certificate and may also be accessed from a certifying authority or certificate authority by the verifier 420.

A document at the signer 410 may have a digital signature generated and applied using the digital signature unit 110, thus creating a signed document 414. The signed document 414 can be transmitted from the signer 410 to the verifier 420. The verifier 420 can use the public information 412 containing unique characteristics of the digital signature unit 110 to simulate portions of the signature generated by digital signature unit 110. These signature portions can be compared with the signature associated with the signed document 414 in order to verify the signature of the signed document 414. Such verification can provide confidence that the signed document 414 properly originated from the digital signature unit 110 at the signer 410.

If a signed document received at the verifier 420 is not verifiable as originating from the digital signature unit 110 associated with the signer 410, then the signed document may be an imposter document 432 as transmitted from an imposter 430 to the verifier 420. Such an imposter document 432 may be sent in an attempt to cause verifier 420 to believe that the imposter document 432 is actually a properly signed document 414 from the signer 410. The digital signature unit 110 may be used to generate a digital signature to be associated with a document as a signed document 414 for verification.

The verifier 420 can perform this verification to support the proper origination of the signed document 414 from the signer 410.

Figure 6:
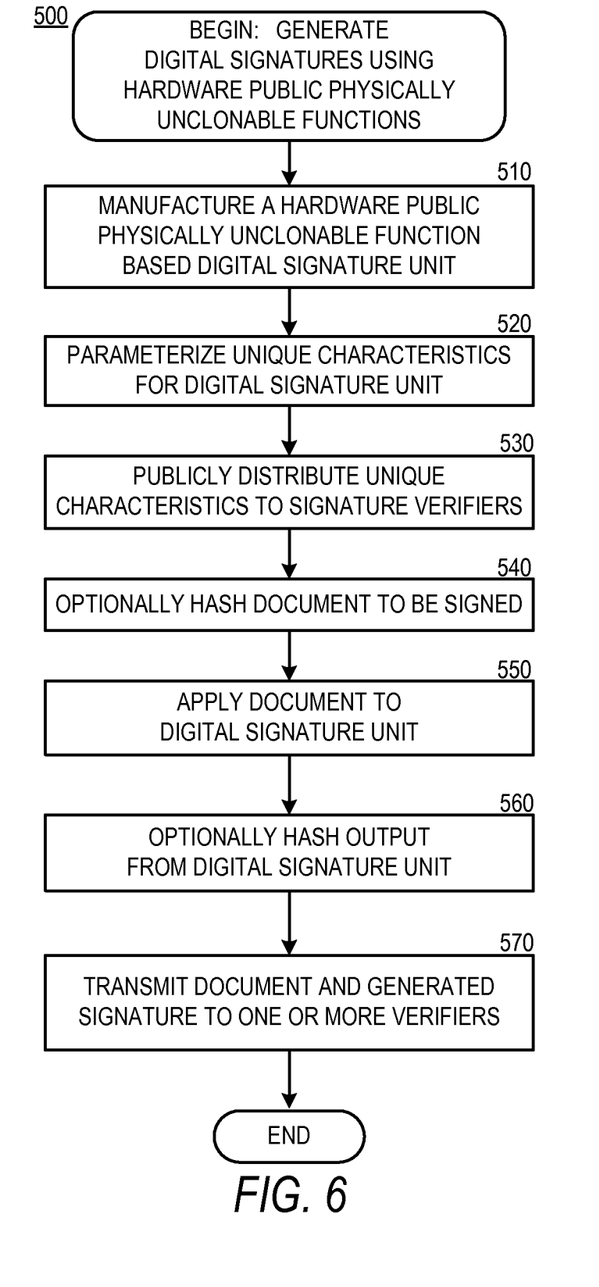
FIG. 6 is a flow diagram illustrating a process for generating digital signatures using hardware public physically unclonable functions.

Referring now to FIG. 6, additional details will be provided regarding the embodiments presented herein for digital signatures using hardware public physically unclonable functions. In particular, FIG. 6 is a flow diagram illustrating a process 500 for generating digital signatures using hardware public physically unclonable functions according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The process 500 begins at operation 510, where a digital signature unit 110 may be manufactured comprising a hardware public physically unclonable function 150. The HPPUF 150 can be manufactured as a plurality of logic gates, semiconductor signal paths, an array of plasmonic paths, a photonic crystal structure, nanowire gates, any other nanowire structure, or any structure that may be varied slightly in each manufacturing instance in a fashion that affects the operation of the structure as measured. The HPPUF 150 may incorporate any number of output registers 160A-160E throughout the signal path within the HPPUF 150.

Continuing to operation 520, unique characteristics associated with the digital signature unit 110 and its hardware public physically unclonable function 150 may be parameterized. Continuing to operation 530, these unique characteristics from operation 520 may be publicly distributed to signature verifiers. The public distribution of the public unique characteristic parameters may originate from the signor 410 or from a certificate authority, or certifying authority.

Continuing to operation 540, a document to be signed by the signor 410 may optionally be hashed prior to signing using the digital signature unit 110. The hash function can be any well-defined mathematical or numerical process for converting input to a specified amount of information or data.

Continuing to operation 550, the document to be signed or the hash of the document to be signed may be applied to the digital signature unit 110 to generate a digital signature. The digital signature may be obtained from the output registers 160A-160E provided within the HPPUF 150 of the digital signature unit 110. At operation 560, the digital signature generated from the digital signature unit 110 at operation 550 may be optionally hashed as well. The digital signature generated by the digital signature unit 110 or the hash of the digital signature generated by digital signature unit 110 may be associated with the document that was signed as a signed document 414. The original document and the digital signature together may be considered the signed document 414. Continuing to operation 570, the document and generated digital signature combined as a signed document 414 may be transmitted to one or more verifiers 420.

Figure 7:
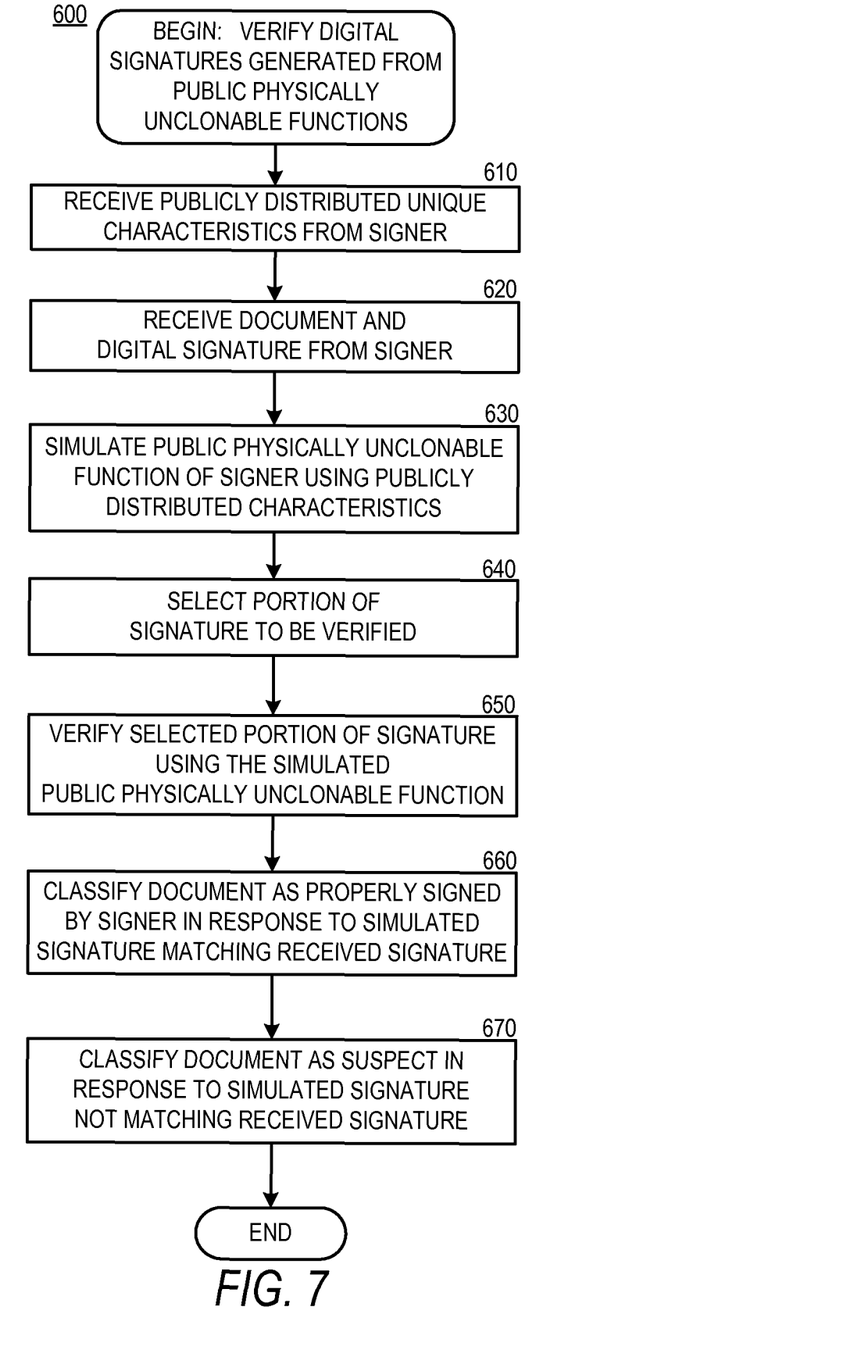
FIG. 7 is a flow diagram illustrating a process for verifying digital signatures generated from public physically unclonable functions.

Referring now to FIG. 7, additional details will be provided regarding the embodiments presented herein for digital signatures using hardware public physically unclonable functions. In particular, FIG. 7 is a flow diagram illustrating a process 600 for verifying digital signatures generated from public physically unclonable functions according to at least some embodiments presented herein.

The process 600 begins with operation 610 where publicly distributed unique parameterized characteristics may be received from a signer 410 at a verifier 420. The publicly distributed unique characteristics can be used at the verifier 420 to simulate operation of the HPPUF 150 associated with the signer 410. The publicly distributed unique characteristics may also be received at the verifier 420 from a certificate authority, or a certifying authority.

Continuing to operation 620, a document and associated digital signature may be received as a signed document 414 by a verifier 410 from a signer 410. Continuing to operation 630, the HPPUF 150 associated with the signer 410 may be simulated at the verifier 420 using the publicly distributed unique characteristics associated with the digital signature unit 110 as delivered in the public information 412.

Continuing to operation 640, a portion of the signature may be selected by the verifier 420 to be verified. The selected portion can be a subset of bit values from one or more output registers 160A-160E of the HPPUF 150, or the selected portion may be the change in values between two or more output registers 160A-160E of the HPPUF 150.

Continuing to operation 650, the portion of the signature as selected in operation 640 may be verified using the simulation of the HPPUF 150 according to the simulation of operation 630. Continuing to operation 660, the document received at the verifier 420 as part of the signed document 414 may be classified as properly singed by the signer 410 in response to the simulated signature matching the signature received as part of the signed document 414.

Alternatively, at operation 670, the document received as the signed document 414 may be classified as suspect in response to the simulated signature as discussed in operation 650 not matching the signature received as part of the signed document 414. Such a suspect document may be an imposter document 432 received from an imposter 430, or such a suspect document may be a properly signed document 414 that incurred errors or alterations during transmission from the signer 410 to the verifier 420. As needed, additional steps may be taken by the verifier 420 to further originate or authenticate the signed document 414 as being from the signer 410. For example, a resend request may be issued to the signer 410 from the verifier 420.

Figure 8:
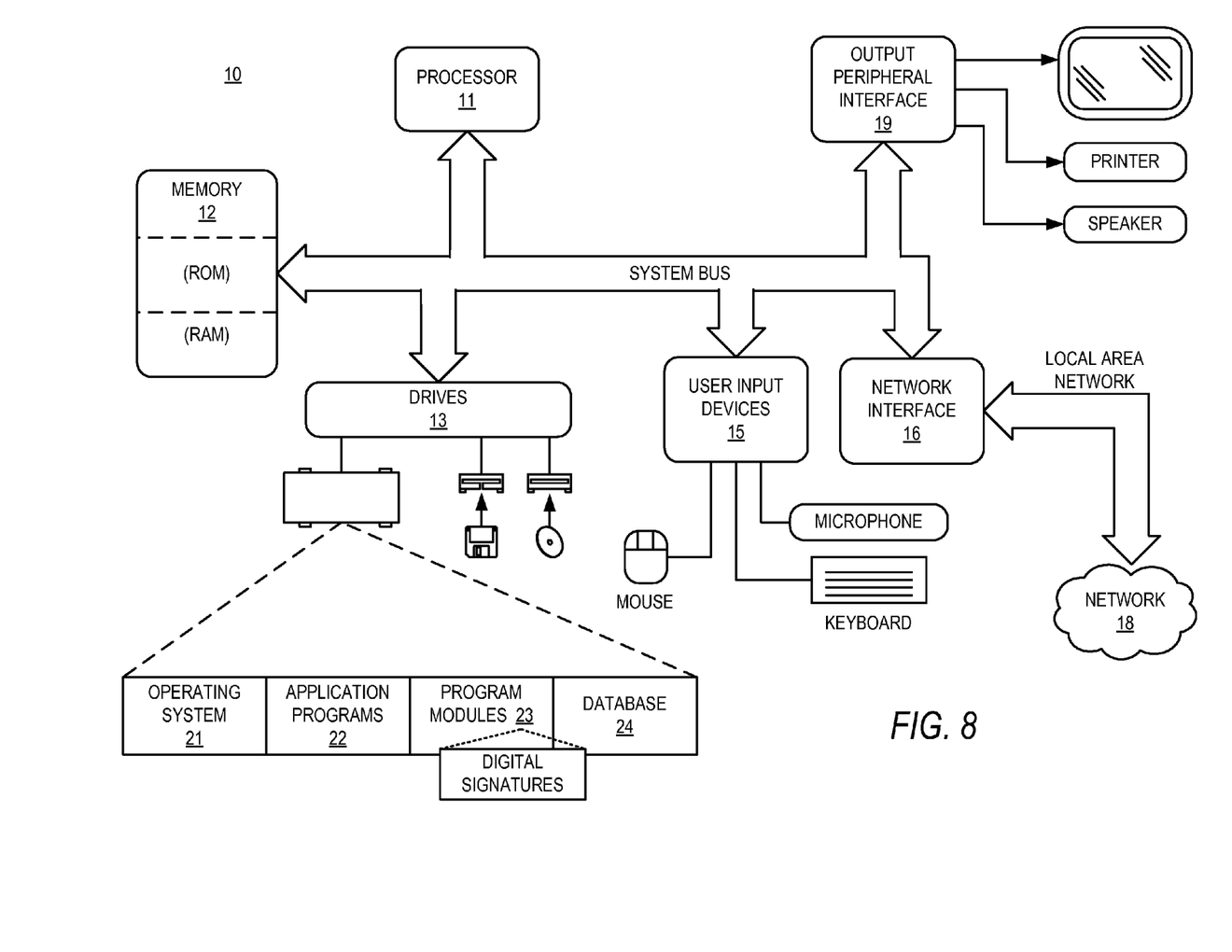
FIG. 8 is a block diagram illustrating an exemplary computing system, all arranged according to embodiments presented herein.

With reference to FIG. 8, an exemplary computing system is illustrated for implementing various embodiments. The computing system can support embodiments for the host computer 120, signer 410, verifier 420, imposter 430, or a computer used in the manufacture and characterization of the digital signature unit 110. The computing system includes a computer 10. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multi-core processor, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof.

The drives 13, other storage devices, or their associated computer-readable storage media can store an operating system 21, application programs 22, program modules 23, and a database 24. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 can generate and verify digital signatures using hardware public physically unclonable functions in accordance with embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23. The program modules 23 may include software instructions that, when loaded into the processor 11 and executed, transform a general-purpose computing system into a special-purpose computing system customized to facilitate digital signature operations using hardware public physically unclonable functions. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 12 transitions between states, thereby transforming the transistors or other circuit elements constituting the processor 11 from a first machine to a second machine, wherein the second machine may be specifically configured to support digital signature operations using hardware public physically unclonable functions. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

What is claimed is:

1. A digital signature generation device comprising:
    a hardware public physically unclonable circuit comprising a plurality of interconnected components, each of the components having an inherent characteristic, not all of the components having an identical value for the inherent characteristic, the inherent characteristics causing transitory states at outputs of at least some of the components during a transition period, the transition period being between a time that an input to the hardware public physically unclonable circuit is changed and a time that all outputs of the hardware public physically unclonable circuit have reached a final value in response to the input being changed, the interconnection of the components and the inherent characteristics providing the hardware public physically unclonable circuit with unique operational characteristics capable of being parameterized;
    an input register for loading input signals into the hardware public physically unclonable function; and
    two or more output registers respectively connected to outputs of selected components within the hardware public physically unclonable circuit for sampling the outputs of the selected components for at least one predetermined time during the transition period to provide a digital signature value, wherein the sampled outputs result in differing digital signature values depending on when the output values of the selected components are sampled by the output registers.

2. The digital signature generation device of claim 1, further comprising a timing mechanism for determining the at least one predetermined time for sampling the output values.

3. The digital signature generation device of claim 1, further comprising an interface to a host computer, wherein the interface is coupled to the input register and the two or more output registers.

4. The digital signature generation device of claim 1, wherein the hardware public physically unclonable circuit operates with a time less than a time used for simulating the hardware public physically unclonable circuit from the parameterized characteristics.

5. The digital signature generation device of claim 1, wherein at least some of the components are logic gates.

6. The digital signature generation device of claim 1, wherein at least some of the components are nanowires.

7. The digital signature generation device of claim 1, wherein at least some of the components are photonic crystals.

8. A method for generating digital signatures using a hardware public physically unclonable circuit, the method comprising:
   loading initial values associated with a message to be signed into an input register associated with the hardware public physically unclonable circuit, wherein the hardware public physically unclonable circuit comprises a plurality of interconnected components, each of the components having an inherent characteristic, not all of the components having an identical value for the inherent characteristic, the inherent characteristics causing transitory states at outputs of at least some of the components during a transition period, the transition period being between a time that an input to the hardware public physically unclonable circuit is changed and a time that all outputs of the hardware public physically unclonable circuit have reached a final value in response to the input being changed, and a latch timing mechanism to sample the outputs of the selected components to provide digital signature values;
   coupling logic signals corresponding to the initial values from the input register into the hardware public physically unclonable circuit;
   propagating the logic signals through the hardware public physically unclonable circuit so as to transform the logic signals into digital signature values; and
   sampling the digital signature values from the hardware public physically unclonable circuit for at least one predetermined time during the transition period into two or more output registers using the latch timing mechanism, wherein the initial values result in a first subset of the digital signature values when the output registers are latched at a first predetermined time using the latch timing mechanism, and wherein the initial values result in a second subset of the digital signature values when the output registers are latched at a second predetermined time using the latch timing mechanism.

9. The method of claim 8, further comprising initializing the input register to a known state prior to loading the initial values.

10. The method of claim 8, wherein the hardware public physically unclonable circuit generates a result with a time less than a time used for simulating the hardware public physically unclonable function to generate the result.

11. The method of claim 8, wherein the hardware public physically unclonable circuit comprises a plurality of logic gates.

12. The method of claim 8, wherein the hardware public physically unclonable circuit comprises nanowires.

13. The method of claim 8, wherein the initial values are generated by hashing the message to be signed.

14. The method of claim 8, further comprising receiving a digital signature request comprising a message to be signed and a timing specification for latching the transformed logic signals into the two or more output registers.

15. A non-transitory computer storage medium having computer-executable instructions stored thereon which, when executed by a computer system, cause the computer system to:
   receive information characterizing unique parameters associated with a hardware public physically unclonable circuit and an output latch register, wherein the hardware public physically unclonable circuit comprises a plurality of interconnected components, each of the components having an inherent characteristic, not all of the components having an identical value for the inherent characteristic, the inherent characteristics causing transitory states at outputs of at least some of the components during a transition period, the transition period being between a time that an input to the hardware public physically unclonable circuit is changed and a time that all outputs of the hardware public physically unclonable circuit have reached a final value in response to the input being changed, and the output latch register samples the outputs of the selected components for at least one predetermined time during the transition period to provide a digital signature value;
   receive a signed document comprising a digital signature;
   select portions of the digital signature to generate by simulation;
   simulate the hardware public physically unclonable circuit based on the information characterizing unique parameters to generate an expected result for the selected portion of the digital signature;
   classify the digital signature as valid in response to matching the expected result for the selected portion of the digital signature with the selected portion of the received digital signature; and
   classify the digital signature as suspect in response to a failure to match the expected result for the selected portion of the digital signature with the selected portion of the received digital signature.

16. The computer storage medium of claim 15, wherein selecting portions of the digital signature comprises random selection.

17. The computer storage medium of claim 15, wherein the simulated digital signature is based upon initial values associated with the signed document and timing specifications for latching outputs from the hardware public physically unclonable circuit.

18. The computer storage medium of claim 15, wherein the expected result comprises a set of results generated within a tolerance window of time.

19. The computer storage medium of claim 15, wherein the selected portion of the received digital signature comprises a portion between two or more specified output registers associated with the hardware public physically unclonable circuit.

20. The computer storage medium of claim 15, wherein the hardware public physically unclonable circuit comprises a plurality of logic gates.

21. The digital signature generation device of claim 1, wherein the hardware public physically unclonable circuit is further configured to receive a digital signature generation request that specifies input values to be loaded into the input register and specifies predetermined times for latching the output values into the output registers.

* * * * *